March 31, 1964  W. N. SUTLIFF  3,126,972
SAFETY JOINT
Filed Jan. 11, 1961
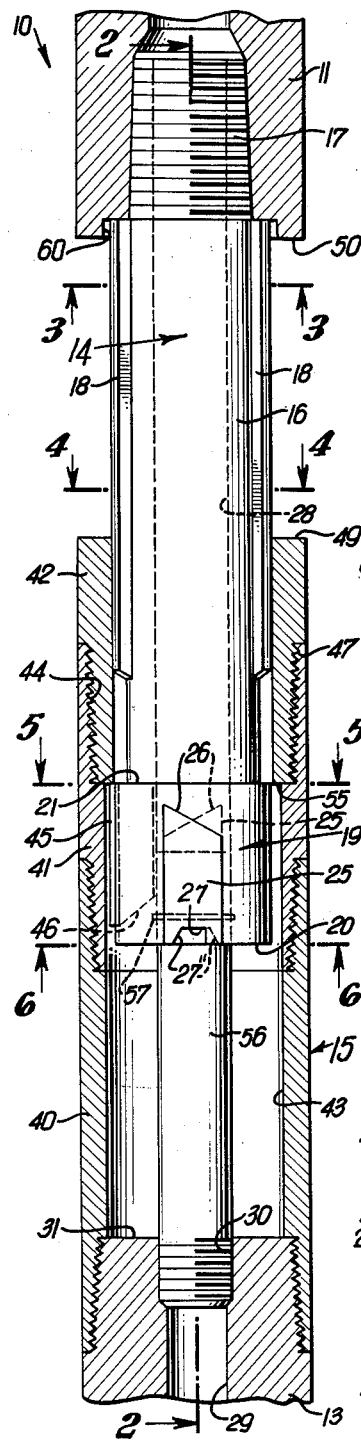
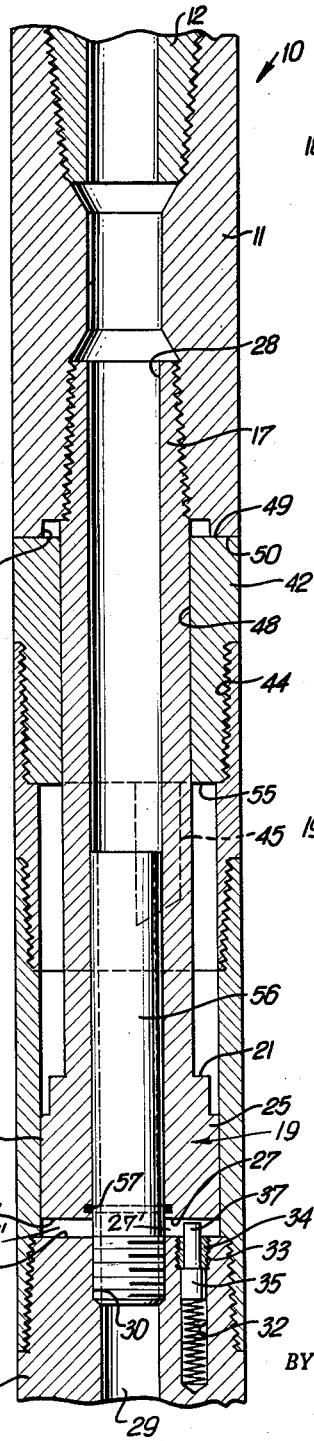
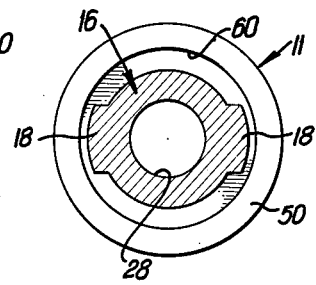
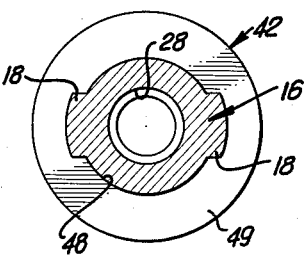
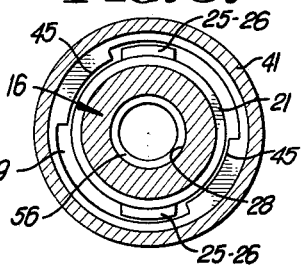
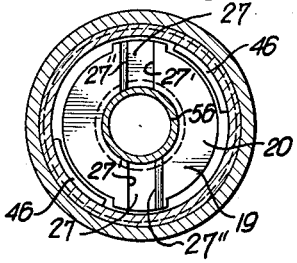
WAYNE N. SUTLIFF
INVENTOR.
BY
ATTORNEY.

3,126,972
SAFETY JOINT
Wayne N. Sutliff, 2931 Pierce Road, Bakersfield, Calif.
Filed Jan. 11, 1961, Ser. No. 82,067
5 Claims. (Cl. 175—294)

This invention relates to safety joints for oil well drilling stems and constitutes an improvement upon the safety joint disclosed in my U.S. Letters Patent No. 2,708,100.

The joint thus patented includes internal and external telescopic joint members connected respectively to juxtaposed ends of upper and lower drill stem sections, said members being held against separation by a stop collar slidably receiving the internal member and screwed onto the external member, by said collar axially confining an annular head provided externally on an end portion of the internal member. A coiled expansion spring within the external member engages the internal member and yieldably holds said head against said collar. With said head so positioned, external splines formed on said head engage other short splines formed internally from the external member to transmit torque from the upper stem section to the lower stem section.

A circumferentially continuous space provided in the external element just below said internal splines allows said external splines to be axially shifted out of engagement with said internal splines by downward pressure on the upper drill stem section sufficient to compress said spring. This can only occur of course when downward movement of the lower stem section in the well is prevented (as by this resting on the bottom of the well).

To disconnect said joint, the axial shifting noted is accomplished coincidentally with application of a substantial counterclockwise torque to the upper end of the upper stem section so that upon disengagement of said splines, the upper stem section rotates rapidly a partial rotation to bring loosely related lugs on said collar and said internal member into engagement with a sharp blow thereby snapping a shear pin normally holding said collar against unscrewing, and starting to unscrew said collar. Further counterclockwise rotation of the upper stem section completes the unscrewing of the collar, thereby freeing the upper stem section for withdrawal, while leaving the lower stem section in the well.

A fluid-tight connection is provided in said joint by an O-ring on the internal member where this extends into the bore in the external member housing the spring.

Although otherwise satisfactory, this patented joint is susceptible to damage if the driller drops the drill stem on the bottom of the well to get a downward jarring action or employs a jarring tool in the drill stem assembly to accomplish such an action.

It is a principal object of the present invention to provide an improved safety joint for use in an oil well drill stem which affords the driller the ready options of rotating the lower drill stem section through the joint, disconnecting the latter to free the upper drill stem section for separate withdrawal, or sustaining downward or upward jarring actions without substantial injury to the joint.

Another object of the invention is to provide such a safety joint which eliminates the spring held relationship between the two telescopic members thereof and affords a substantial free axial movement between said members, at either terminus of which, the joint itself may be employed to effect a substantial axial jarring blow on the lower stem section.

A further object is to provide such a safety joint which is especially adapted for use in oil well testing operations in which the joint is assembled below the packer and testing tool and facilitates the removal of the testing tool and the packer in case the drill stem section below the joint becomes stuck in the well.

The manner of accomplishing the foregoing objects as well as further objects and advantages will be made manifest in the following description taken in connection with the accompanying drawings in which:

FIG. 1 is a vertical sectional view of a preferred embodiment of the invention showing the two telescopic members of the device in their maximum extended relation.

FIG. 2 is a vertical sectional view taken on the line 2—2 of FIG. 1 and showing said telescopic members in their maximum axially collapsed relation as when accomplishing a downward jarring blow on the lower stem section.

FIG. 3 is a horizontal sectional view taken on the line 3—3 of FIG. 1 and looking upwardly and shows the cross-sectional contour of the splined mandrel of the internal tubular member of the device and also shows the area of the annular horizontal hammer face of the top sub of the invention which is exposed downwardly for effecting a downward hammer blow with the device.

FIG. 4 is a horizontal sectional view taken on the line 4—4 of FIG. 1 and looking downwardly, this view disclosing the horizontal anvil face area exposed at the upper end of the stop collar of the invention against which a blow may be imparted by the top sub descending suddenly into contact therewith.

FIG. 5 is a horizontal cross-sectional view taken on the line 5—5 of FIG. 1 and looking downwardly, this view showing the annular horizontal upper hammer face provided by the head of the internal tubular member of the device by which the latter may strike an upward blow by bringing this surface into face-to-face contact with the lower face on said stop collar. This view also shows the circumferential relationship of the drive and driven lugs of the device which permits rotation of the aforesaid mandrel through a substantial angle, when said drive lugs are located between said driven lugs, without the drive lugs contacting the driven lugs.

FIG. 6 is a horizontal sectional view taken on the line 6—6 of FIG. 1 and looking upwardly, this view showing the hammer face formed on the bottom of the mandrel head aforesaid which is adapted to engage the upper anvil face of the bottom sub of the device when the latter is used to strike a downward jarring blow on the lower stem section. This view also shows the recesses formed in opposite directions from the axis of said head in the lower face thereof to receive a spring-urged pin when said head is in engagement with said bittom sub to prevent the accidental disconnection of said joint.

Referring specifically to the drawings, the invention is there disclosed as embodied in a safety joint 10 which includes a top sub 11 threadedly connected to an upper drill stem section 12, a bottom sub 13, which is connected to a lower drill stem section (not shown), an inner tubular member 14, and an outer tubular member 15.

The inner tubular member 14 includes a relatively small diameter heavy mandrel 16 having a threaded pin 17 at its upper end which screws into sub 11 and a pair of diametrically opposite splines 18 which extend from the pin end 17 of the mandrel to a level a short distance above an annular hammer head 19 which is formed externally from mandrel 16 at lower end. The bottom end of the head 19 has a flat radial hammer face 20 while the upper end of said head has an annular flat hammer face 21.

Formed externally on the hammer head 19 to extend diametrically in opposite directions therefrom are vertical torque drive lugs 25. Upper ends of the lugs 25 are provided with oblique cam faces 26 the purpose of which will be made clear hereinafter. Formed upwardly in the lower hammer face 20 of the hammer head 19 is a pair of diametrically opposed pin-receiving recesses 27, each having one radial wall 27' which is normal to face 20 and one radial wall 27" which is inclined relative to said face. The inner tubular member 14 has a bore 28 which is of uniform diameter throughout its length.

The bottom sub 13 has an axial bore 29 with a tapped counterbore 30 at its upper end and is externally threaded. Between the counterbore 30 and threaded exterior of the bottom sub 13 the latter is provided with a flat anvil face 31. Formed eccentrically downwardly in the face 31 of the sub 13 parallel with the axis of the latter is a bore 32 having a tapped counterbore 33 for receiving a threaded collar 34 by which a plunger 35 is trapped in the bore 32 along with a tightly compressed expansive coil spring 36, the plunger 35 having formed integrally therewith a heavy pin 37 which extends upward through collar 34. When the head 19 is shifted downwardly to bring the hammer face 20 thereof into contact with the anvil face 31 and the head then rotated so as to bring one of recesses 27 opposite said pin, the latter is urged upward by spring 36 into said recess.

The outer tubular member 15 of the safety joint 10 includes a straight piece of tubing 40 which is relatively long, a relatively short driven lug sub 41 and an anvil stop collar 42.

The tube 40 is internally threaded at its upper and lower ends and screws onto the threaded upper end of bottom sub 13. It has an internal bore 43 which is uniform throughout its length.

Sub 41 is a piece of tubing with the same external and interior diameters as the tube 40 and is externally threaded at the lower end so as to screw into the upper end of tube 40 and has internal left hand threads 44 in its upper end. Formed inwardly from the bore of sub 41 is a pair of vertical driven lugs 45 which start at the lower end of threads 44 and extend downwardly to oblique cam faces 46 located some distance above the lower end of the sub 41.

Anvil stop collar 42 is a fairly short collar having external left handed threads 47 which screw into the threads 44 to unite the collar 42 with sub 41. Collar 42 has a bore 48 which fits and slidably receives the mandrel 16 and its splines 18 as shown in FIG. 4. This provides a broad upper anvil face 49 which is exposed to face-to-face contact with a horizontal flat annular hammer face 50 provided on top sub 11. As the specially shaped bore 48 of the collar 42 is uniform throughout the length of said collar, a similar bottom anvil face 55 is provided on said collar in opposition to the hammer face 21 of the hammer head 19.

The bore 43 extends axially downwardly from anvil face 55 provided on the lower end of stop collar 42 to anvil face 31 provided on the upper end of bottom sub 13. Where the hammer head 19 is relatively short in length, as shown in the drawings, it is preferable that the bore 43 be two or three times the length of head 19, so that the free play vertically of said head in said bore may be over a sufficient vertical distance to allow a substantial hammer blow to be struck either upwardly or downwardly with the tool 10.

The bore, 43, however, must have an axial length in excess of the length of the hammer head 19 plus the axial overlap of said driven lugs 45 with respect to said drive lugs 25 when said head is at the upper end of said bore, as shown in FIG. 1. The vertical or axial overlap of the lugs 45 and 25, above referred to, is clearly measureable by reference to FIG. 1 and constitutes that precise distance which hammer head 19 must be lowered from its uppermost position in bore 43 in order for said head to be rotatable in said bore without causing engagement between said lugs 45 and 25.

The absolute minimum length of bore 43 with the head 19 and lugs 45 and 25 proportioned as shown in the drawings, is thus seen to be somewhat less than twice the axial length of hammer head 19, because these lugs will disengage each other when head 19 has moved downward a distance somewhat less than the axial length of said head from the uppermost position of said head in which it is shown in FIG. 1.

Provided axially on the sub 13 and having its lower end screwed into the threaded counterbore 30 of said sub is a wash pipe 56, the outer diameter of which is such as to allow it to slidably fit the bore 28 of mandrel 16, the latter bore being provided with an annular recess accommodating an O-ring 57 which forms a hydraulic seal between the wash pipe 56 and the mandrel 16.

*Operation*

When a drill stem embodying the safety joint 10 is being run into a well, or operated therein as in drilling or testing, the joint is extended as in FIG. 1. Torque lugs 25 and 45 are thus at the same level thereby transmitting torque from the upper stem section to the lower stem section. If drilling, the weight imposed on the bit while rotating the same is thus limited to the weight of said lower stem section.

Whenever occasion arises for striking a jarring blow with the safety joint 10, a downward blow may be struck merely by dropping the upper section of the drill stem resulting in blows being struck simultaneously by the hammer faces 50 and 20 against the anvil face 49 and 31 respectively.

If an upward blow is now desired, the upper drill stem section 12 is lifted rapidly until the hammer face 21 engages the anvil face 55 as shown in FIG. 1. The bypassing of the lugs 25 and 45 in this operation is assured by the fact that these lugs retain the same orientation during the upward blow that they had at the start of the downward blow (as shown in FIG. 1).

Whenever it is desired to disconnect the joint 10, the upper drill stem section 12 is merely lowered until the lugs 25 clear the lugs 45, and without lowering the head 19 far enough to engage the pin 37, the upper drill stem section is now rotated in a clockwise directioin tending to tighten all of the right hand threaded joints therein and readily unscrewing the left handed threads 47 of the collar 42 from threads 44 of the sub 41 where upon it is possible to withdraw the upper drill stem section 12 from the well leaving the lower drill stem section therein.

The recess and pin mechanism 27—37 functions primarily to prevent inadvertent clockwise rotation of the upper string section 12 relative to the lower string section when the hammer head 19 rests downwardly on anvil face 31, the importance of this being that such clockwise rotation would unscrew theh left-hand threads 47 and disconnect the joint 10. Such inadvertent relative clockwise rotation between said sections is prevented by the pin 37 being engaged by one of the radial walls 27' of one of the recesses 27, causing clockwise rotation of upper string section 12 to be transmitted to the lower string section through sub 13. Counterclockwise rotation of the upper string section, while resting downward on anvil face 31, however, is not transmitted to the lower string section because, when the pin 37 rises into one of the recesses 27 during such counterclockwise rotation of head 19, an inclined wall 27" of said recess is pressed against said pin which acts as a cam to depress said pin flush with face 31, permitting counterclockwise rotation of the upper string section relative to the lower string section to continue indefinitely. This feature permits the driller to snug the left-hand threads 44—47 between the stop collar 42 and the sub 41 where these have become partly unscrewed, or even to reassemble the joint 10 after it has been entirely separated by unscrewing said collar.

It is to be understood that, while the pin 37 shown in the drawings is provided primarily to prevent inadvertent unscrewing of the collar 42 when the joint members are completely relatively collapsed as in FIG. 2, this pin and the recesses 27 for receiving the same may be multiplied in number and be employed for transmitting normal drilling torque from the upper stem section to the lower stem section, when it is desired to temporarily increase the weight applied to the bit.

The oblique cam faces 26 and 46 on lugs 25 and 45 are provided to relatively rotate the lower and upper drill stem sections to cause these lugs to mesh whenever raising the mandrel happens to produce a head-on collison between the drive lugs and the driven lugs.

The lower end of upper sub 11 has a substantial annaular recess 60 formed therein wide enough to receive splines 18 of mandrel 16. This prevents rocks caught between faces 49 and 50 in a downward jarring operation from swedging the metal in face 49 against the mandrel 16 and thus interfering with the free sliding of the mandrel in the collar 42.

The joint 10 (of any given diameter) is susceptible of being made in any desired length merely by lengthening the mandrel 16, the tube 40 and the wash pipe 56. Lengthening the joint increases the severity of the blow which can be struck in a jarring operation.

What is claimed is:

1. In a safety joint for joining upper and lower drill stem sections, the combination of: an internal tubular member connected at its upper end to said upper stem section, said member having external spline means formed thereon, and being externally enlarged concentrically at its lower end to form a relatively short cylindrical head; a plurality of torque drive lugs formed externally from said head and equally spaced circumferentially by substantial distances; an external tubular member having internal threads provided in an upper end portion thereof and having an annular internal abutment shoulder provided in a lower portion thereof, and internal bore being provided between said internal threads and said abutment shoulder, said bore slidably accommodating said head and drive lugs, said lower external member portion being connected to said lower drill stem section; a stop collar slidably received on said internal tubular member and having external threads matching said internal threads and screwed thereinto, said collar also having internal spline means slidably receiving therein said external spline means; a plurality of torque driven lugs formed internally from said external tubular member just below said internal threads and of approximately the same axial dimension as said head, said driven lugs being equally spaced circumferentially and being dimensioned to allow said drive lugs to freely pass axially therebetween when said head slides in said bore, upper ends of said drive lugs and lower ends of said driven lugs having similarly pitched, oblique cam faces, the length of said bore being substantially in excess of the length of said head plus the axial overlap of said drive and driven torque lugs when said head is at the upper end of said bore, said annular abutment shoulder comprising an anvil and the annular bottom of said head a hammer for accomplishing a downward jarring action by suddenly lowering said upper drill stem section when said lower section is supported from beneath.

2. A safety joint as recited in claim 1 wherein the hammer face of said head is provided with at least one radial recess having one radial wall normal to said face: and a vertically slidable pin mounted in said annular internal shoulder and having means for spring pressing the same upwardly above the anvil surface thereof so that upon the lowering of said head onto said shoulder, said pin will be depressed flush with said anvil face if said pin is out of vertical alignment with said recess, but upon rotation of said head in a given direction until said recess moves over said pin, the latter will be elevated into said recess, whereupon said normal side wall of said recess will engage said pin and thus transmit torque from said upper drill stem section to said lower drill stem section, and will thus prevent relative rotation in said given direction between said sections so long as said head remains lowered against said annular shoulder.

3. A safety joint as recited in claim 2 wherein said recess has one inclined radial wall which engages said pin when the direction of rotation of said upper stem section is reversed, and depresses said pin flush with said anvil face whereby said reverse rotation of said upper section relative to said lower section is not impeded by said pin.

4. A safety joint as recited in claim 3 wherein said threads in said external tubular member and on said stop collar are left-handed and in which the other threads employed in making up said drill stem sections are right-handed, and in which said recess and pin connection between said head and said annular shoulder transmits clockwise rotation from said upper section to said lower section but allows said upper section to idle relative to said lower section when the former is rotated counter-clockwise, thereby tending to tighten said left-hand threads.

5. A safety joint as recited in claim 1 wherein the internal diameter of said internal tubular member including the lower portion thereof forming said head is substantially uniform; a washpipe fixed axially within the annular shoulder formed at the lower end of said external tubular member and extending upwardly into said internal tubular member in telescopic relation therewith at all times while said safety joint is assembled; and O-ring means forming a hydraulic seal between said internal member and said washpipe.

References Cited in the file of this patent
UNITED STATES PATENTS

| | | |
|---|---|---|
| 1,621,583 | Creighton | Mar. 22, 1927 |
| 1,804,700 | Maxwell | May 12, 1931 |
| 2,538,690 | Johnston | Jan. 16, 1951 |
| 2,557,349 | Howard | June 19, 1951 |
| 2,708,100 | Sutliff | May 10, 1955 |
| 2,837,315 | Burns et al. | June 3, 1958 |
| 2,877,851 | Richardson | Mar. 17, 1959 |